(12) United States Patent
Ahn et al.

(10) Patent No.: US 6,717,916 B1
(45) Date of Patent: Apr. 6, 2004

(54) METHOD AND APPARATUS FOR INITIALIZING A PACKET TRAFFIC CHANNEL IN A COMMUNICATION SYSTEM

(75) Inventors: Jae-Min Ahn, Seoul (KR); Soon-Young Yoon, Seoul (KR); Hee-Won Kang, Seoul (KR); Young-Ky Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/115,499

(22) Filed: Jul. 14, 1998

(30) Foreign Application Priority Data

Jul. 25, 1997 (KR) .............................. 97-34920
Jan. 13, 1998 (KR) .............................. 98-1477

(51) Int. Cl.[7] .......................... H04B 7/00; H04Q 7/00; H04L 12/26
(52) U.S. Cl. ...................... 370/252; 455/522; 370/328; 370/349; 370/350
(58) Field of Search ............... 370/320, 322, 370/324, 328, 335, 341, 342, 441, 457, 311, 252, 253, 349, 350; 455/13.4, 38.3, 343, 522

(56) References Cited

U.S. PATENT DOCUMENTS

| | | | |
|---|---|---|---|
| 4,939,510 A | | 7/1990 | Masheff et al. |
| 5,365,450 A | | 11/1994 | Schuchman et al. |
| 5,383,177 A | | 1/1995 | Tateishi |
| 5,390,299 A | | 2/1995 | Rege et al. |
| 5,392,281 A | | 2/1995 | Baumert et al. |
| 5,392,287 A | * | 2/1995 | Tiedemann, Jr. et al. .. 370/95.1 |
| 5,418,812 A | | 5/1995 | Reyes et al. |
| 5,467,344 A | | 11/1995 | Solomon et al. |
| 5,473,612 A | * | 12/1995 | Dehner, Jr. et al. ...... 370/105.4 |
| 5,499,237 A | | 3/1996 | Richetta et al. |
| 5,528,664 A | | 6/1996 | Slekys et al. |
| 5,533,019 A | | 7/1996 | Jayapalan |
| 5,535,210 A | | 7/1996 | Smolinske et al. |
| 5,541,917 A | | 7/1996 | Farris |
| 5,560,021 A | | 9/1996 | Vook et al. |
| 5,570,355 A | | 10/1996 | Dail et al. |
| 5,583,562 A | | 12/1996 | Birch et al. |
| 5,590,133 A | | 12/1996 | Billström et al. |
| 5,596,601 A | * | 1/1997 | Bar-David .................. 375/207 |
| 5,617,424 A | | 4/1997 | Murayama et al. |
| 5,621,723 A | * | 4/1997 | Walton, Jr. et al. ........... 370/18 |
| 5,666,348 A | | 9/1997 | Thornberg et al. |
| 5,666,364 A | | 9/1997 | Pierce et al. |
| 5,670,964 A | * | 9/1997 | Dent .......................... 342/457 |
| 5,673,259 A | | 9/1997 | Quick, Jr. |
| 5,708,656 A | | 1/1998 | Noneman et al. |
| 5,732,085 A | | 3/1998 | Kim et al. |
| 5,734,867 A | | 3/1998 | Clanton et al. |
| 5,742,588 A | | 4/1998 | Thornberg et al. |
| 5,745,695 A | | 4/1998 | Gilchrist et al. |
| 5,757,772 A | | 5/1998 | Thornberg et al. |
| 5,758,256 A | | 5/1998 | Berry et al. |
| 5,764,687 A | * | 6/1998 | Easton ....................... 375/206 |
| 5,771,461 A | * | 6/1998 | Love et al. ................. 455/522 |
| 5,796,776 A | * | 8/1998 | Lomp et al. ................ 375/222 |
| 5,898,697 A | * | 4/1999 | Hurme et al. ............... 370/508 |
| 5,943,331 A | * | 8/1999 | Lavean ...................... 370/335 |
| 6,078,572 A | * | 6/2000 | Tanno et al. ................ 370/335 |
| 6,137,788 A | * | 10/2000 | Sawahashi et al. ......... 370/342 |

OTHER PUBLICATIONS

Milwaukee, Wisconsin presentation of Jul. 14–18, 1997, 14 pages.

* cited by examiner

Primary Examiner—Alpus H. Hsu
Assistant Examiner—Toan D. Nguyen
(74) Attorney, Agent, or Firm—Dilworth & Barrese, LLP

(57) ABSTRACT

A method of initializing a packet traffic channel in a communication system to efficiently use channel capacity in a packet data service and to reduce time and power required to initialize a packet traffic channel includes timing alignment between a terminal and a base station, controlled access collision between terminals, use of preamble patterns, and a comb-type correlator branch.

26 Claims, 13 Drawing Sheets

METHOD AND APPARATUS FOR INITIALIZING A PACKET TRAFFIC CHANNEL IN A COMMUNICATION SYSTEM

BACKGROUND OF THE INVENTION

1. Field of the Invention

The present invention relates to a channel controlling methods and apparatus for data service in a mobile communication system and, more particularly, to methods and apparatus for initializing a reverse packet traffic channel.

2. Description of the Related Art

FIG. 1 is a block diagram of a terminal (e.g., fixed or mobile subscriber station), a base station, and a radio link in a mobile communication system. The radio link of FIG. 1 is composed of a forward channel for data transmission from the base station to the terminal and a reverse channel for data transmission from the terminal to the base station.

A conventional CDMA mobile communication system has a forward channel structure as shown in FIG. 3 and a reverse channel structure as shown in FIG. 2. The forward CDMA channel has a pilot channel, a sync channel, a paging channel, and a forward traffic channel divided into a fundamental channel and a supplemental channel. The reverse CDMA channel includes an access channel and a reverse traffic channel divided into a fundamental channel and a supplemental channel.

A conventional bidirectional traffic channel has too low a bit rate to provide a packet data service. An approach to ensuring a bit rate high enough for implementing a packet data service in a conventional bidirectional traffic channel is to separate the traffic channel into a fundamental channel and a supplemental channel. The fundamental channel provides the same function of the conventional bidirectional traffic channel and the supplemental channel provides packet data communication. For a packet data service, a call is maintained between a base station and a terminal, as shown in FIG. 1, via forward and reverse fundamental channels.

FIG. 4 is a state transition diagram of a terminal on the basis of a conventional CDMA standard. Referring to FIG. 4, when power is on in a state 411, the terminal is set to an initialization state 412. If the terminal synchronizes its timing to that of a system in the initialization state 412, the terminal transits to an idle state 413. The terminal may attempt a call, the base station transmits information of the call attempt to the terminal on a paging channel, and the terminal sends a page response message to the base station, in the idle state 413. Then, the terminal is set to a system access state 414. If the terminal fails to obtain a paging channel message or is directed from the base station to a different adjacent base station in a handoff in the idle state 413, the terminal returns to the initialization state 412. Here, if the terminal succeeds in system access state except for the call attempt or reception of a call acknowledge signal in the system access state 414, the terminal returns to the idle state 413. However, if the terminal succeeds in the call attempt or reception of the call acknowledge signal in the system access state 414, the terminal goes to a traffic channel state 414. The traffic channel state 414 lasts as long as traffic is processed. When traffic channels stop their action, the terminal returns to the initialization state 412.

A communication system maintains a call on bidirectional fundamental channels despite infrequent transmit/receive packets in the conventional packet data service. In this case, a signal transmitted on the bidirectional fundamental channels interferes with another channel, resulting in wasted capacity of another supportable service in the CDMA communication network. Furthermore, as more users demand the packet data service, the CDMA mobile communication network becomes less accessible to users confined to voice communication on fundamental channels only.

Packet data is transmitted according to the call state transition diagram of FIG. 4 in a CDMA system based on IS-95. Such call processing is suitable not for a connectionless oriented service, such as a packet data service, but for a connection oriented service, such as a voice service, because a large amount of time is required to reach mobile acquisition due to too many states involved between a call drop and a call set-up and transmission of many messages. As shown in FIG. 4, the initialization state 412, the idle state 413, and the system access state 414 should be passed through before resuming the traffic channel state 415.

Therefore, there is a need for simplifying the state transition for a call set-up by introducing a packet idle state and a packet busy state so that a reliable packet traffic service can be provided by use of mobile acquisition information only, from an initial call set-up to a call reset-up for a packet service.

Another problem associated with conventional packet data service is the mobile acquisition method. A mobile acquisition rate may be insignificant in a service having a call maintained to the end, such as a voice call, but it is a significant factor to determine system throughput in a service required to disconnect a call, such as a packet data service. Thus, the entire system performance would depend on how fast a terminal transits from the packet idle state to the packet busy state. In conventional mobile acquisition, power control starts when a base station sends an acknowledgement after acquisition of an 80 ms or longer access channel. If the base station fails to acquire the access channel and send an acknowledgement, an access probe is transmitted at a power level that is a base station-specified amount higher than the previous access probe after a 160 ms or longer delay designated by the base station due to impossibility of fast power control on the access channel.

The above-described conventional packet data service has, inter alia, the following problems:

(1) The 80 ms or above access channel is longer than needed in a packet data service.

(2) Both a terminal and a base station wait longer than needed because power control begins only after the acknowledgement of the base station. The delay may be one or more seconds, which is a long time in consideration of a CDMA frame being 20 ms in duration. Thus, possible fast power control at the start of access can reduce the time required for retransmission of an access probe after a delay.

(3) Despite a random delay for preventing access collision between terminals in CDMA access, access collisions increase with more users of a packet data service, which is a significant cause of access failures since another user's signal acts as interference in CDMA.

SUMMARY OF THE INVENTION

An object of the present invention is to provide methods and apparatus for initializing a reverse packet traffic channel, which can reduce an access time during a packet data service.

Another object of the present invention is to provide methods and apparatus for initializing a reverse packet traffic channel, which can reduce an excessive output signal magnitude of a terminal by rapidly implementing power control at an initial access time point.

Still another object of the present invention is to provide methods and apparatus for initializing a reverse packet traffic channel, which can prevent access collisions by removing a random delay in an access to a packet data service in a mobile communication system.

To achieve the above and other objects, there is provided methods and apparatus for initializing a packet traffic channel in a communication system. In one method and apparatus, a delay time of a forward channel signal transmitted from a base station to the terminal is detected and reported to the delay time to the base station, and the timing of the terminal is synchronized to that of the base station, in a packet idle state after a call set-up. Access collision between terminals attempting to access to a base station is controlled by assigning a specific time slot to each terminal in an access attempt and causing the terminal to access in the assigned time slot. A mobile acquisition is rapidly achieved by repeatedly using short preamble patterns for terminals. A power control is performed on the packet traffic channel by adding correlation values in a search window of the specific time slot.

These and other objects, features and advantages of the present invention will become apparent from the following detailed description of illustrative embodiments thereof, which is to be read in connection with the accompanying drawings in which the same reference numerals are used throughout the various figures to designate same or similar components.

DETAILED DESCRIPTION OF PREFERRED EMBODIMENTS

Figure 1:
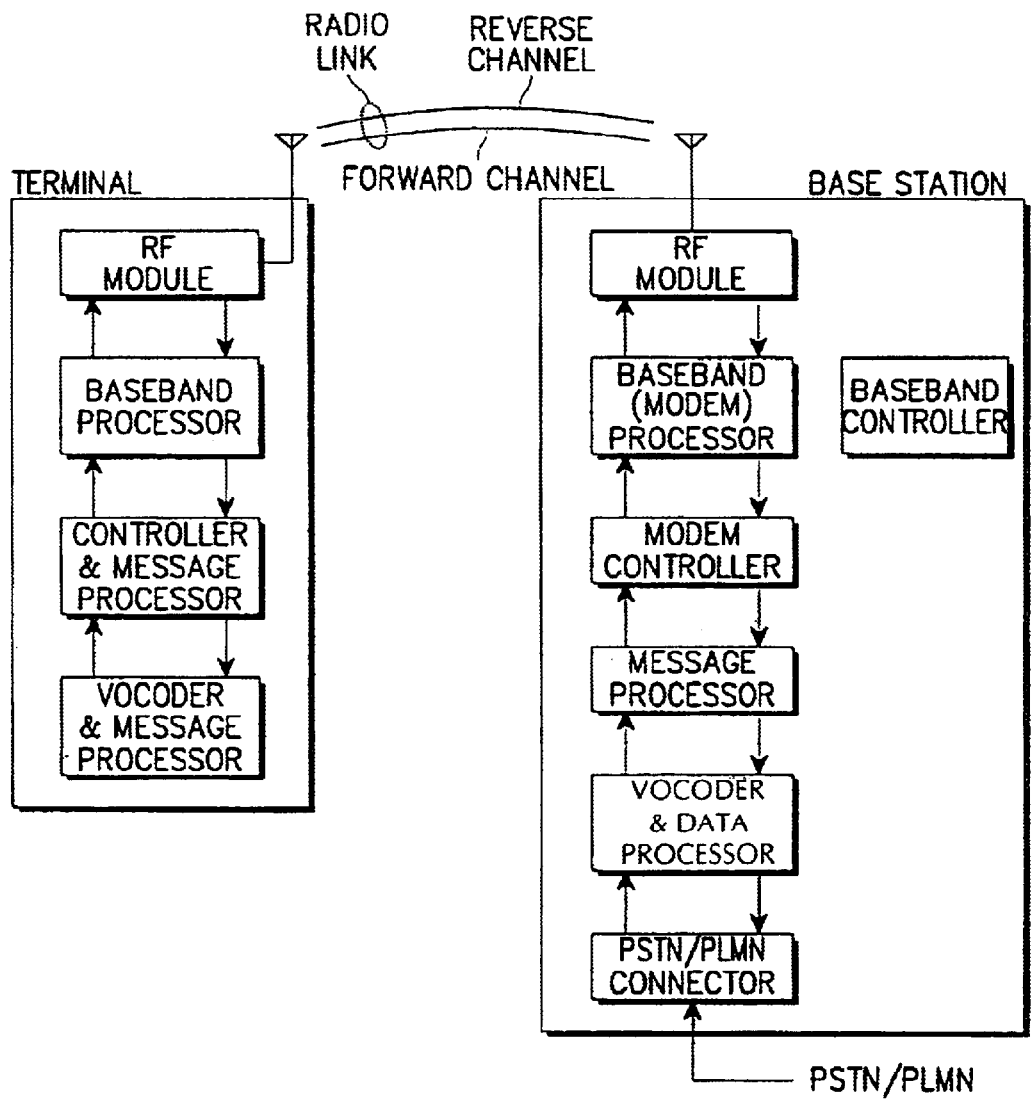
FIG. 1 is a block diagram of a terminal, a base station, and a radio link in a mobile communication system.
Figure 2:
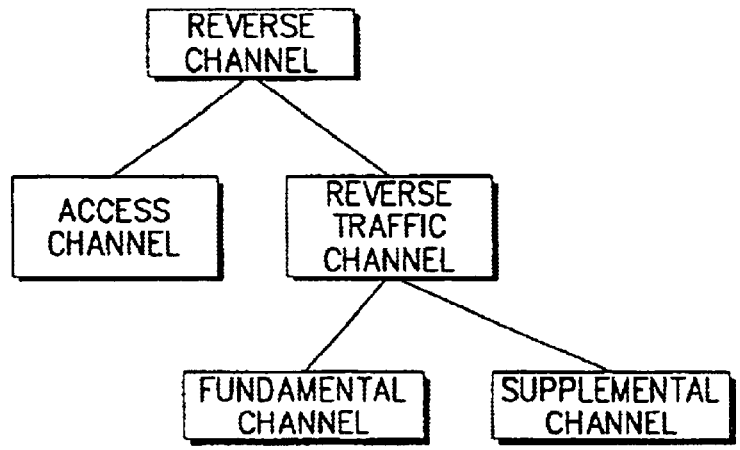
FIG. 2 illustrates the structure of a reverse channel for a conventional packet data service.
Figure 3:
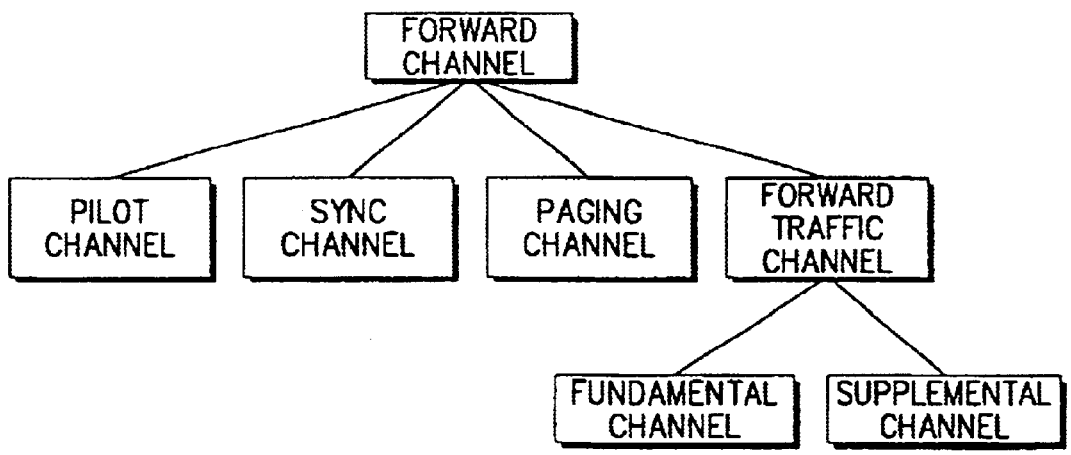
FIG. 3 illustrates the structure of a forward channel for the conventional packet data service.
Figure 4:
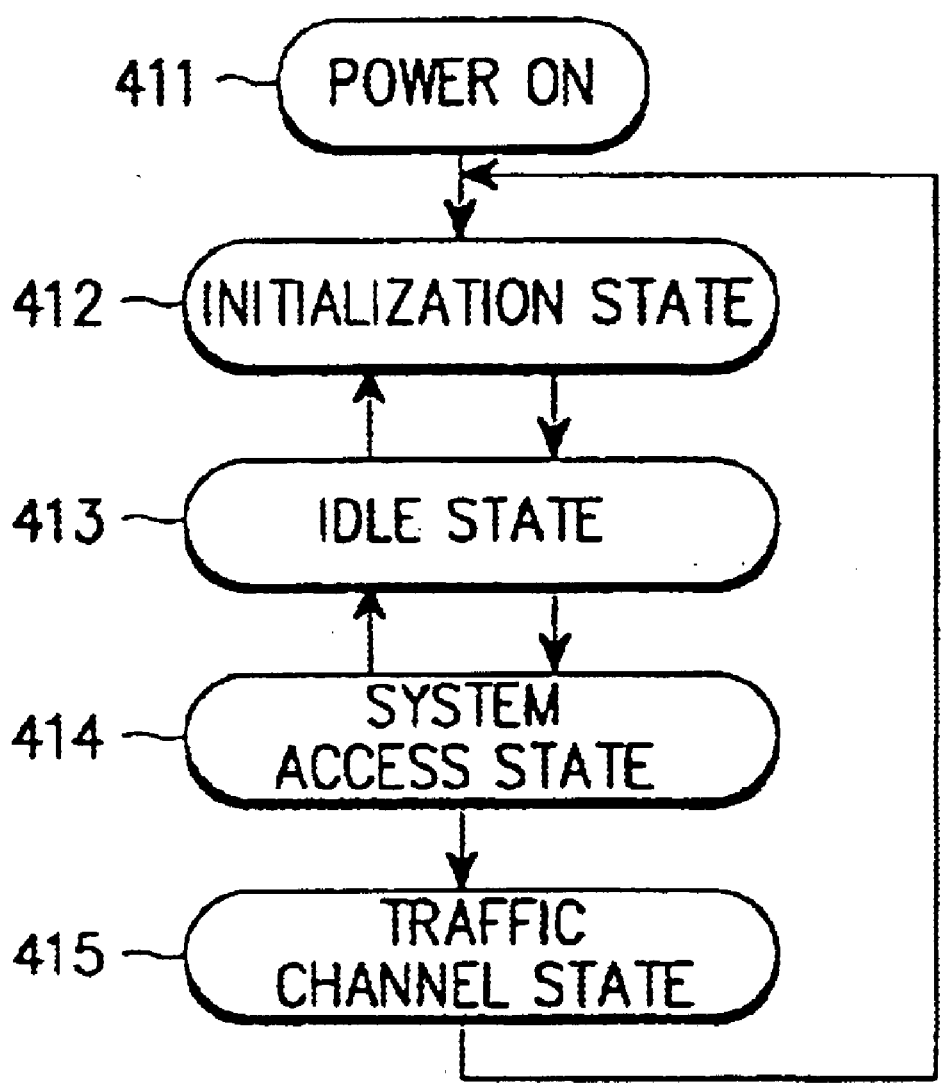
FIG. 4 is a state transition diagram of a terminal on the basis of a conventional CDMA standard.
Figure 5:
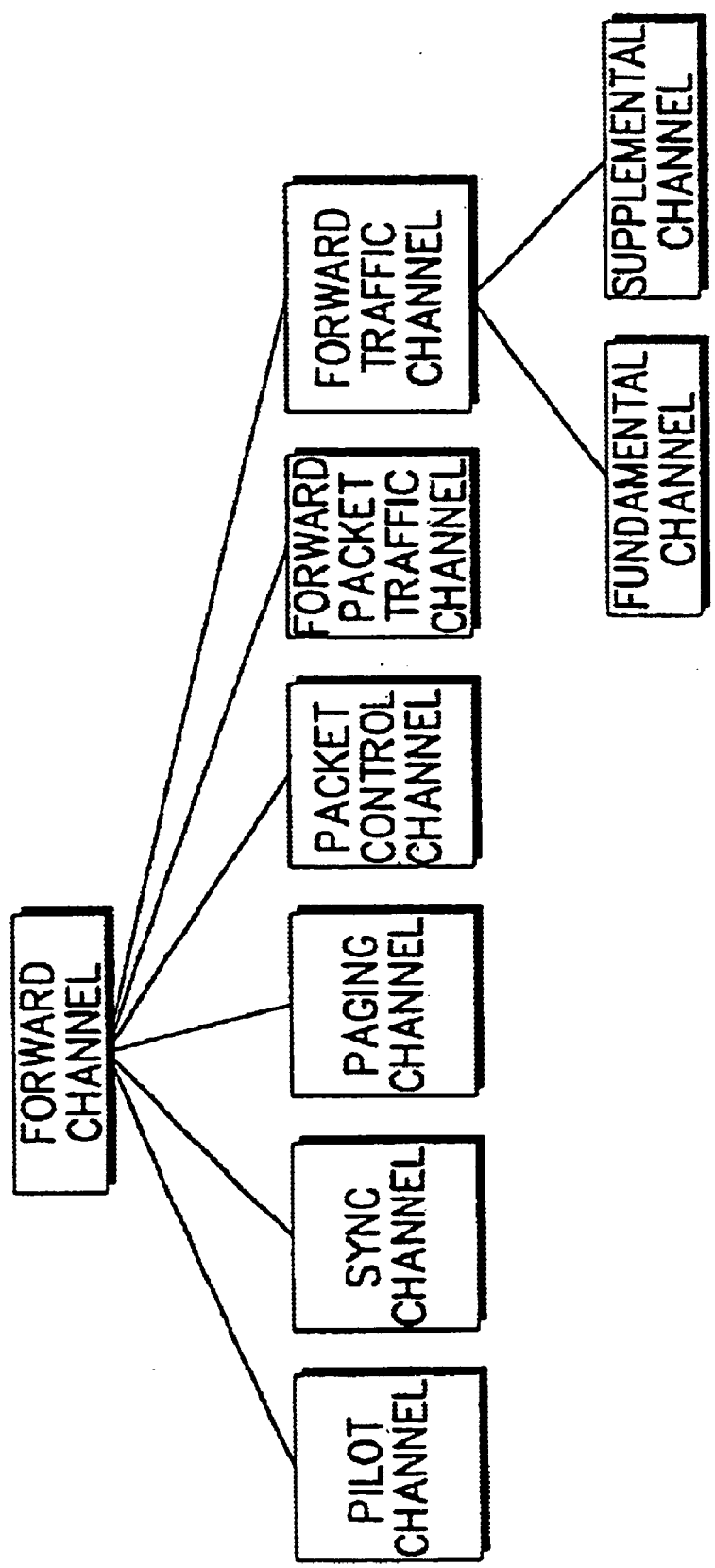
FIG. 5 illustrates the structure of a forward channel for a packet data service according to an embodiment of the present invention.
Figure 6:
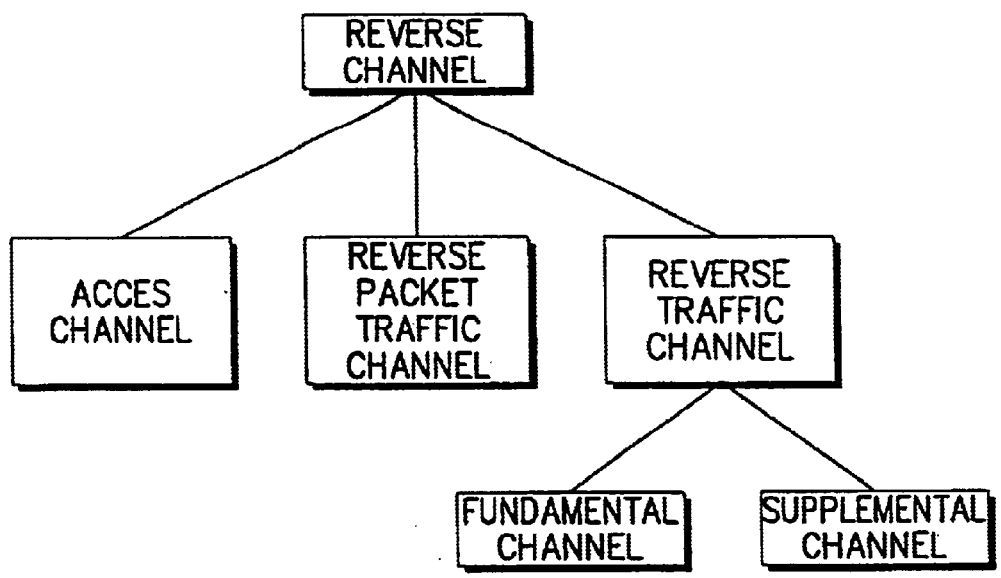
FIG. 6 illustrates the structure of a reverse channel for the packet data service according to an embodiment of the present invention.

New channel structures are designed for a packet data service according to the present invention, as shown in FIGS. 5 and 6. Referring to FIG. 5, a forward channel of the present invention includes a pilot channel, a sync channel, a paging channel, a packet control channel, a forward packet traffic channel, and a forward traffic channel. The forward traffic channel is further divided into a fundamental channel and a supplemental channel. Referring to FIG. 6, a reverse channel of the present invention includes an access channel, a reverse packet traffic channel, and a reverse traffic channel. The reverse traffic channel is also divided into a fundamental channel and a supplemental channel.

Two forward channels and one reverse channel are newly defined in the channel structures of FIGS. 5 and 6 for the packet data service according to an embodiment of the present invention: the packet control channel and the forward packet traffic channel in the forward channel; and the reverse packet traffic channel in the reverse channel. The forward packet traffic channel supports a path of packet data travelling on a forward link from a base station to a terminal. The reverse packet traffic channel supports a path of packet data travelling on a reverse link from the terminal to the base station.

It is to be appreciated that the packet control channel controls terminals so that a large number of terminals accommodate a small number of forward and reverse packet traffic channels. Further, the packet control channel also serves to control the output power level of a terminal accessing the system on the reverse packet traffic channel, thereby controlling system capacity, in turn.

Figure 7:
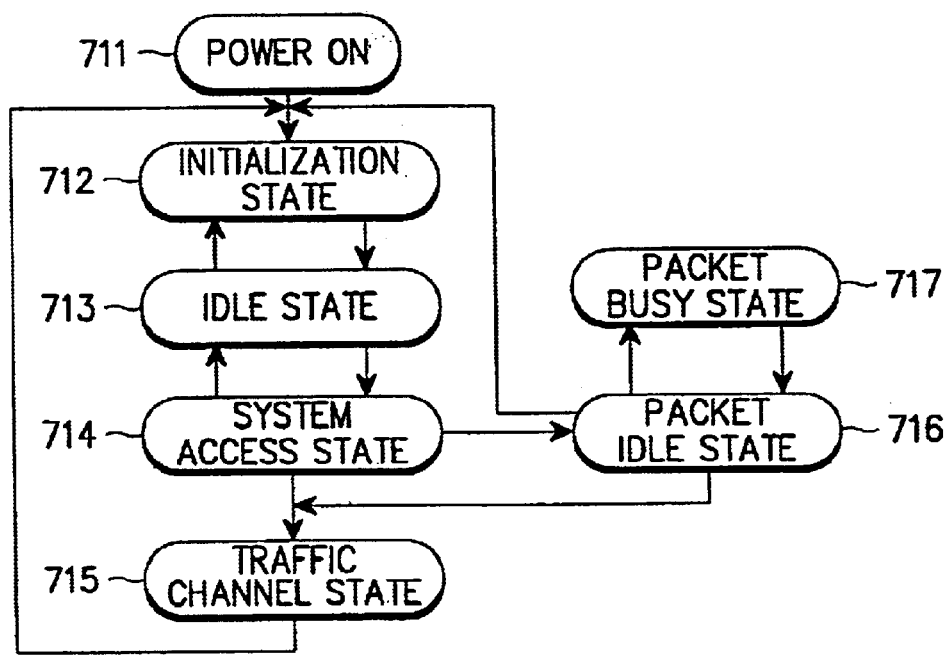
FIG. 7 is a state transition diagram illustrating terminal call processing states for the packet data service according to an embodiment of the present invention.

Referring now to FIG. 7, a state transition diagram of a terminal for packet data service according to an embodiment of the present invention is shown. When power is initially on in a state 711, the terminal is set to an initialization state 712. If the terminal synchronizes its timing to that of a system in the initialization state 712, the terminal transits to an idle state 713. The terminal may attempt a call, the base station transmits information of the call attempt to the terminal on a paging channel, and the terminal sends a page response message to the base station on an access channel, in the idle state 713. Then, the terminal is set to a system access state 714. If the terminal fails to obtain a paging channel message or is directed from the base station to a different adjacent base station in a handoff in the idle state 713, the terminal returns to the initialization state 712.

If the terminal succeeds in the call attempt or reception of the call acknowledge signal in the system access state 714, the terminal goes to a traffic channel state 715. However, if the terminal succeeds in system access except for the call attempt or reception of a call acknowledge signal in the system access state 714, the terminal returns to the idle state 713. When a packet mode is registered in the system access state 714, the terminal is set to a packet idle state 716. Meanwhile, when traffic channels stop their action in the traffic channel state 715, the terminal returns to initialization state 712.

During transmission/reception of packet data, the terminal is directed from the packet idle state 716 to a packet busy state 717. Upon completion of packet transmission/reception, the terminal returns to the packet idle state 716. The terminal alternates between the packet idle state 716 and the packet busy state 717 depending on packet data transmission/reception or vice versa. When the packet mode is over in the packet idle state 716, the terminal returns to the initialization state 712.

The terminal, mainly aiming at a packet data service as shown in FIG. 7, transits not to the traffic channel state 715 but to the packet idle state 716 upon registration of the packet mode in the system access state 714.

In the packet idle state 716, the terminal periodically monitors a packet control channel to determine whether there is packet data to be received on a forward packet traffic channel. In the presence of received packet data, the terminal demodulates the forward packet traffic channel during a predetermined time in the packet busy state 717.

When there is packet data to be transmitted from the terminal in the packet idle state 716, the terminal waits for an authorization to use a reverse packet traffic channel, while monitoring the packet control channel. Upon receipt of the authorization, the terminal transmits the packets on the reverse packet traffic channel in the packet busy state 717.

Upon completion of the packet data transmission/reception on the forward and reverse packet traffic channels in the packet busy state 717, the terminal periodically monitors the packet control channel again in the packet idle state 716.

Efficient use of channels in a mobile communication system for the packet data service requires distinctiveness in on and off conditions of a signal, and channel capacity can be increased with a shorter initialization of packet traffic channels in a signal-on condition.

In order to realize the above and other advantages, the present invention employs four schemes: (1) timing alignment between a terminal and a base station; (2) controlled access collision between terminals; (3) use of known preamble pattern; and (4) fast power control.

(1) Timing Alignment Between Terminal and Base Station

While a call is maintained in CDMA, both the terminal and the base station have tracking capability to track the path of the other party and thus can synchronize their timing for signal demodulation. On the other hand, when the call is disconnected and an access attempt is performed to reset up a call, as shown in FIG. 7, it is difficult to estimate how a round trip delay is changed. Thus, a conventional access channel needs a long preamble.

Figure 8:
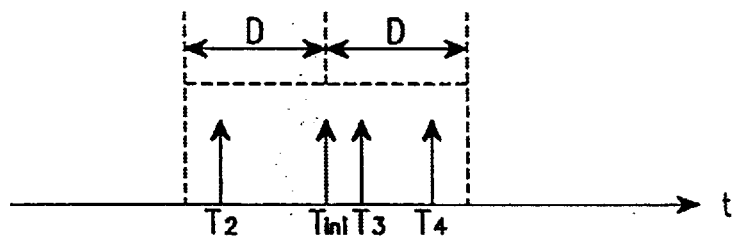
FIG. 8 is a graphical diagram illustrating delay times for timing alignment.

However, in accordance with the present invention, the terminal station stores a delay of a signal received from the base station, as indicated by $T_{ini}$ in FIG. 8, in the packet idle state 716 after an initial call set-up. The terminal synchronizes its timing to that of the base station with respect to the delay time, while monitoring and reporting the delay time of a signal received from the base station.

The terminal can report the delay time periodically or set a new initial delay by reporting the delay time if it exceeds a delay time initially set by the terminal and the base station by a threshold value. Reference character D in FIG. 8 denotes the threshold delay value initially set by the base station and the terminal.

Figure 9:
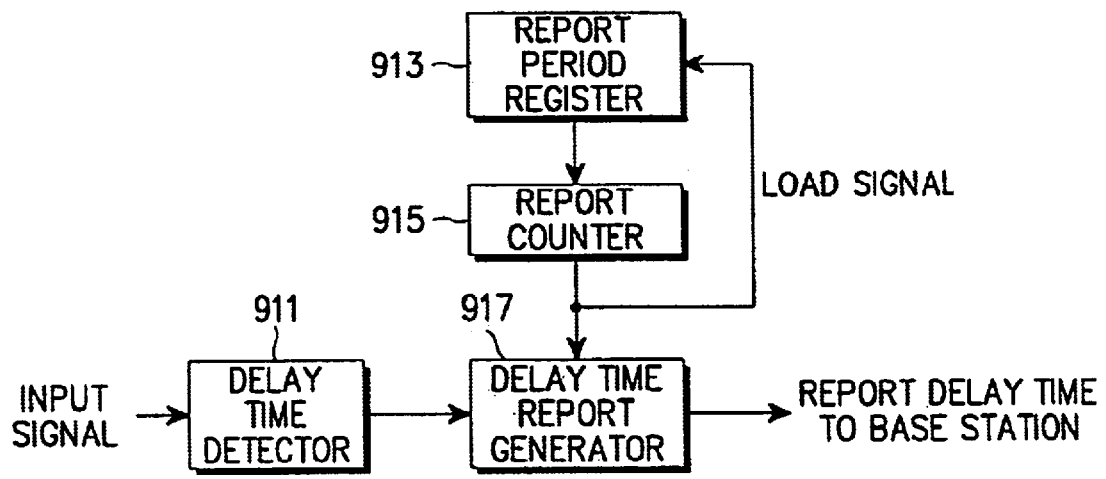
FIG. 9 is a block diagram of terminal circuitry for reporting a delay time of a forward channel signal to a base sation by a predetermined period.

FIG. 9 is a block diagram of terminal circuitry, according to an embodiment of the present invention, for periodical delay time reporting of the terminal. Referring to FIG. 9, a delay time detector 911 detects a delay of a forward channel by monitoring a forward channel signal received in a terminal. A report period register 913 stores a period value for reporting a delay time to the base station and outputs the period value upon generation of a load signal. A report counter 915 counts the report period by a clock signal (not shown) and generates a control signal for reporting the delay time to the base station upon completion of counting. The report counter 915 also generates the load signal and loads the period value stored in the report period register 913 to be counted. A delay time report generator 917 outputs the delay time received from the delay time detector 911 to the base station according to the output of the report counter 915.

In FIG. 9, the delay time detector 911 detects a delay time of a forward channel by continuously monitoring a forward channel signal received by the terminal. The delay time report generator 917 prepares the detected delay time received from the delay time detector 911 as data to be reported to the base station. When the terminal accesses the base station, the base station designates a period for the terminal to report a delay time and the terminal stores the designated period in the report period register 913. The report period register 913 outputs the stored report period value to the report counter 915 by a load signal. The report counter 915 counts the report period value received from the report period register 913. If the counted value is a maximum or minimum value, the report counter 915 outputs the counted value as a report signal to the delay time report generator 917. The report signal is applied to the report period register 913 as a load signal. Thus, the report period register 913 loads the delay time report period value to the report counter 915.

Figure 10:
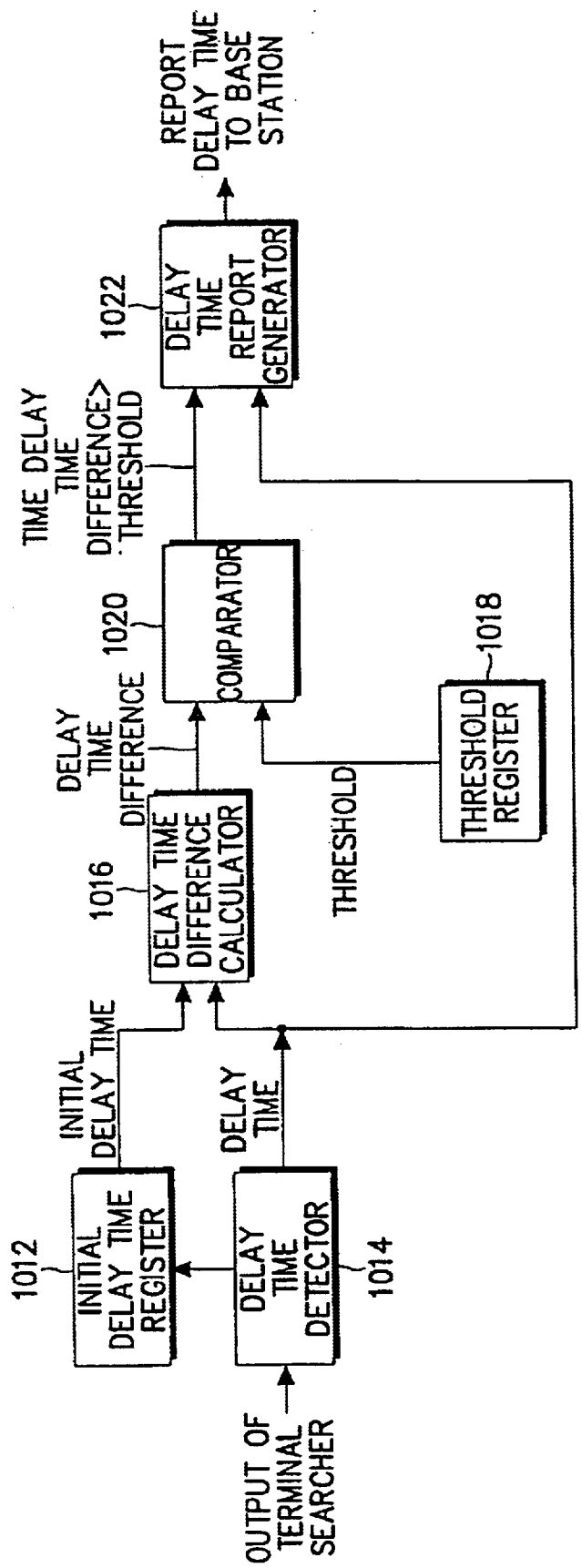
FIG. 10 is a block diagram of terminal circuitry for reporting a measured forward delay time to the base station if the difference between a recorded initial time delay and the measured forward time delay exceeds a predetermined threshold.

FIG. 10 is a block diagram of terminal circuitry, according to an embodiment of the present invention, for reporting a delay time when the delay time exceeds a delay time initially set by the base station and the terminal by a predetermined threshold. Referring to FIG. 10, a delay time detector 1014 detects a delay time of a forward channel received in the terminal by monitoring the forward channel signal. An initial delay time register 1012 generates an initial delay time and loads the output of the delay time detector 1014 to be stored therein upon generation of a load signal in a comparator 1020. A delay time difference calculator 1016 receives the outputs of the delay time detector 1014 and the initial delay time register 1012, obtains the absolute value of the result by subtracting the delay time from the initial delay time, and generates a delay time difference signal. A threshold register 1018 stores a threshold value for the delay time difference. The comparator 1020 compares the delay time difference with the threshold value, and simultaneously generates a load signal to the initial delay time register 1012 and a control signal for reporting the delay time if the delay time difference is larger than the threshold value. A delay time report generator 1022 reports the delay time received from the delay time detector 1014 to the base station upon receipt of the control signal from the comparator 1020.

Still referring to FIG. 10, the delay time detector 1014 calculates a delay time of a forward channel by continuously monitoring a signal received on the forward channel by the terminal. The delay time is applied simultaneously to the delay time report generator 1022 and the delay time difference calculator 1016. The delay time report generator 1022 uses the delay time as data to be reported to the base station, and the delay time difference calculator 1016 subtracts the delay time from the initial delay time stored in the initial delay time register 1012 and obtains the absolute value of the result. The initial delay time register 1012 stores an initial delay time during a call set-up as data for use in calculating the delay time difference and is updated to a new initial delay time if the delay time difference exceeds a threshold. This updating procedure is implemented only when the output of the comparator 1020 indicates that the delay time difference is larger than the threshold value. In this case, the delay time report generator 1022 sends the base station a delay time reporting message using the delay time received from the delay time detector 1014.

It is to be appreciated that, according to the invention, time can be assigned with use of the reported delay time in two methods: the base station moves a search window according to the reported delay time or the base station orders the terminal to adjust its transmission time so that a signal can be transmitted in a fixed search window from the terminal to the base station.

Figure 11:
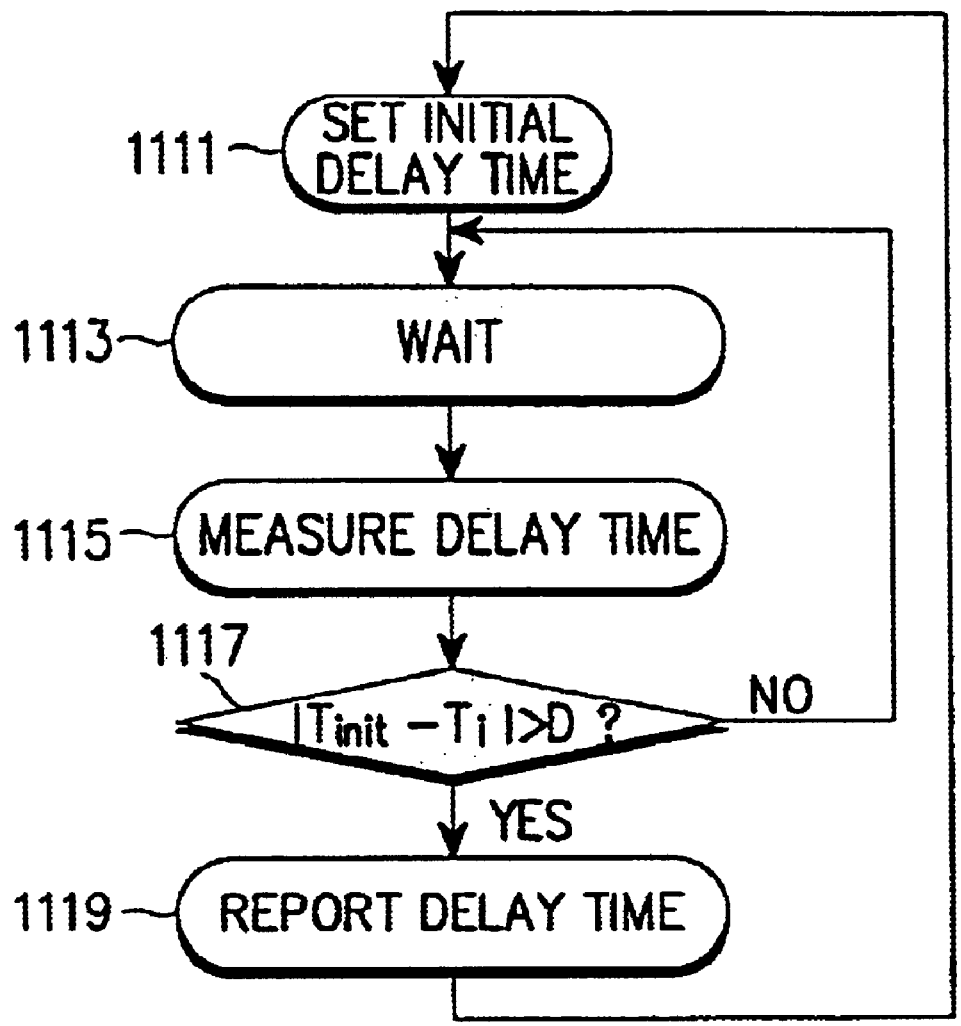
FIG. 11 is a flowchart illustrating a method of determining the difference between a time delay and a threshold.

FIG. 11 is a flowchart illustrating a method of reporting a delay time from the terminal to the base station using the threshold, according to the invention.

Referring to FIG. 11, an initial delay time $T_{init}$ is set in step 1111 and the terminal waits for a predetermined time in step 1113. Then, a delay time $T_i$ is measured in step 1115. In step 1117, the absolute value of the result from subtracting the measured delay time from the initial delay time is calculated and compared with the threshold value. If the absolute difference is not larger than the threshold value, the procedure goes back to step 1113. Otherwise, the delay time is reported in step 1119. Then, to update the initial delay time, the procedure returns to step 1111.

(2) Controlled Access Collision Between Terminals for Gaining Access to Base Station Access channel collision between terminals leads to mutual interference and thus failures in acquisition of an access channel. Yet, only if the base station can control the terminals access to the base sation, the terminals can avoid collision or, at least, access to the base station with collisions at an acceptable level. In addition, if the terminals can be differentiated despite the collisions, the terminals performing an access attempt can all be acquired. In the present invention, the terminals employ different preambles and codes.

The present invention provides for two ways for the base station to control terminals access: one is to assign a specific time slot to each user terminal at the start of an access attempt in a packet data mode so that the terminal can access the base station in its corresponding time; and the other is to designate which terminal to access in each time slot so that the designated terminal can access the base station in the corresponding time slot.

In the former method, the indexes of time slots are repeated (time slots are numbered 0, 1, 2, 3, . . . , N–1, 0, 1, 2, . . . ) and each terminal is assigned its specific time slot number to access in the corresponding time slot. A terminal having no data to transmit in its corresponding time slot gives up accessing, thereby reducing the number of collisions. Under the access control, all the accessing terminals can be acquired by limiting the maximum number of terminals supportable in one time slot to the number of preambles or codes supportable by the base station.

Figure 12:
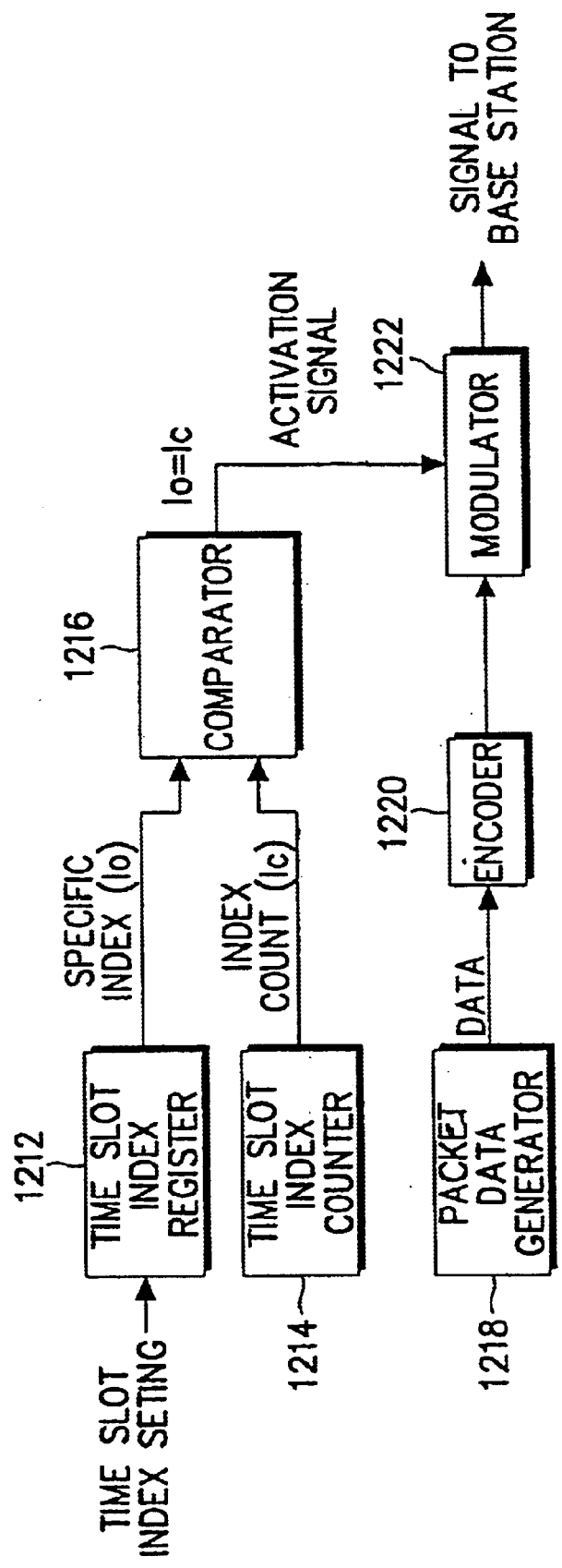
FIG. 12 is a block diagram of terminal circuitry for accessing the base station at a predetermined time for transmission of packet data.

FIG. 12 is a block diagram of terminal circuitry, according to an embodiment of the present invention, for controlling access collision by assigning each terminal a specific time slot number and causing the terminal to access in its corresponding time slot. Referring to FIG. 12, a time slot index register 1212 stores time slots set to designate terminals by the base station, and generates a specific index Io. A time slot index counter 1214 counts the time slot index and generates an index count Ic. A comparator 1216 compares the outputs of the time slot index register 1212 and the time slot index counter 1214 and generates a control signal (activation signal) for access to the base station when they are equal. A packet data generator 1218 generates packet data to be transmitted to the base station. An encoder 1220 encodes the packet data received from the packet data generator 1218 in a designated method. A modulator 1222 modulates the encoded packet data received from the encoder 1220 in a suitable output form, and outputs the modulated data upon receipt of the control signal from the comparator 1216.

In FIG. 12, a time slot index assigned to a terminal by the base station is stored in the time slot index register 1212 and compared with the output of the time slot index counter 1214 by the comparator 1216. If they are equal, the comparator 1216 generates a control signal for accessing the base station. In the presence of data to be transmitted from the terminal to the base station, the data is encoded, modulated, and transmitted to the base station upon generation of the control signal from the comparator 1216.

Figure 13:
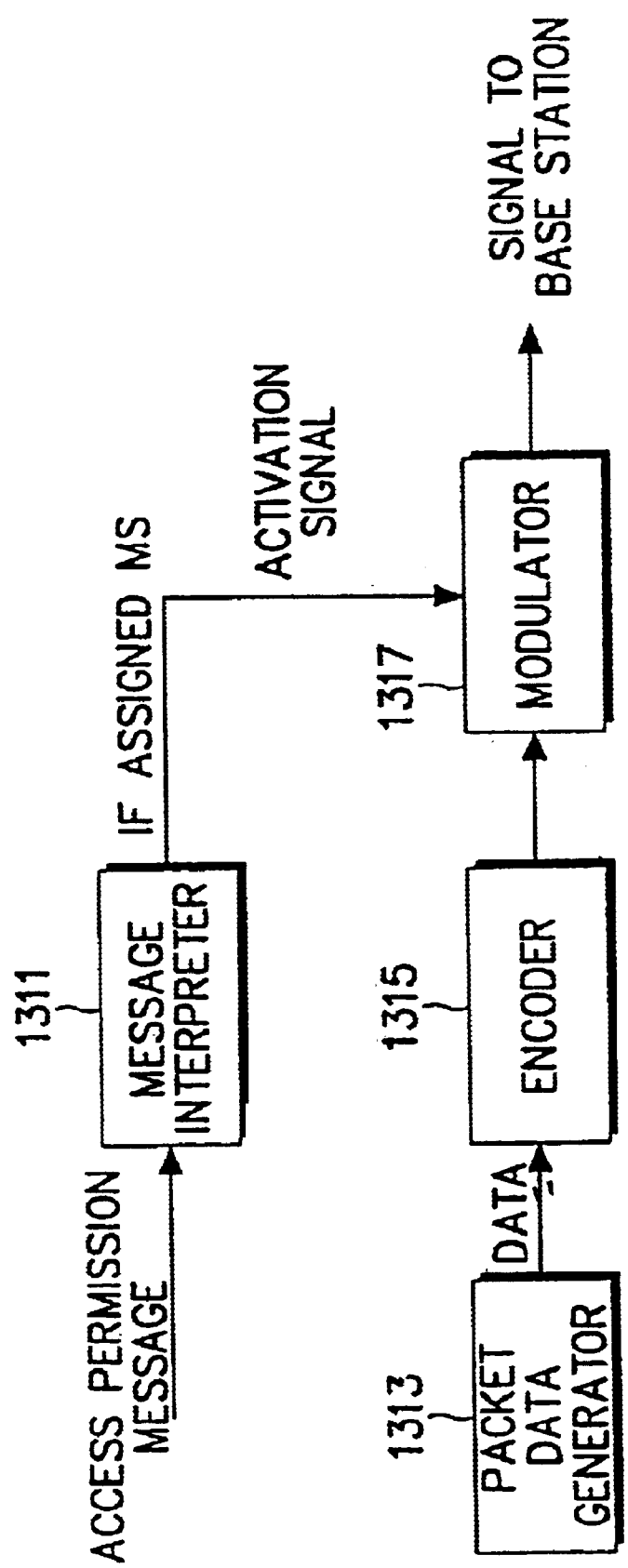
FIG. 13 is a block diagram of terminal circuitry for transmitting packet data from the terminal to the base station by time assignment of the base station.

FIG. 13 is a block diagram of terminal circuitry, according to an embodiment of the present invention, implemented for access control in such a way that the base station designates which terminal to access in each time slot on a packet control channel and the designated terminal accesses the base station in its corresponding time slot. In FIG. 13, a message interpreter 1311 analyses a message received from the base station and generates a control signal for enabling the terminal to access to the base station, if the received message is an access permission message. A packet data generator 1313 generates packet data to be transmitted to the base station. An encoder 1315 encodes the packet data received from the packet data generator 1313 in a designated method. A modulator 1317 modulates the encoded data in a suitable output form and sends the modulated data to the base station upon receipt of the control signal from the message interpreter 1311.

Still referring to FIG. 13, the base station sends a control signal for designating a terminal to access the base station in each time slot. The message interpreter 1311 analyses a message received on a forward channel from the base station and determines whether the terminal is authorized to access the base station. If the terminal is authorized, the message interpreter 1311 generates the control signal for enabling the terminal to access the base station. In the presence of data to be transmitted to the base station, the data is encoded, modulated, and sent to the base station in synchronization with the control signal output from the message interpreter 1311.

Figure 14:
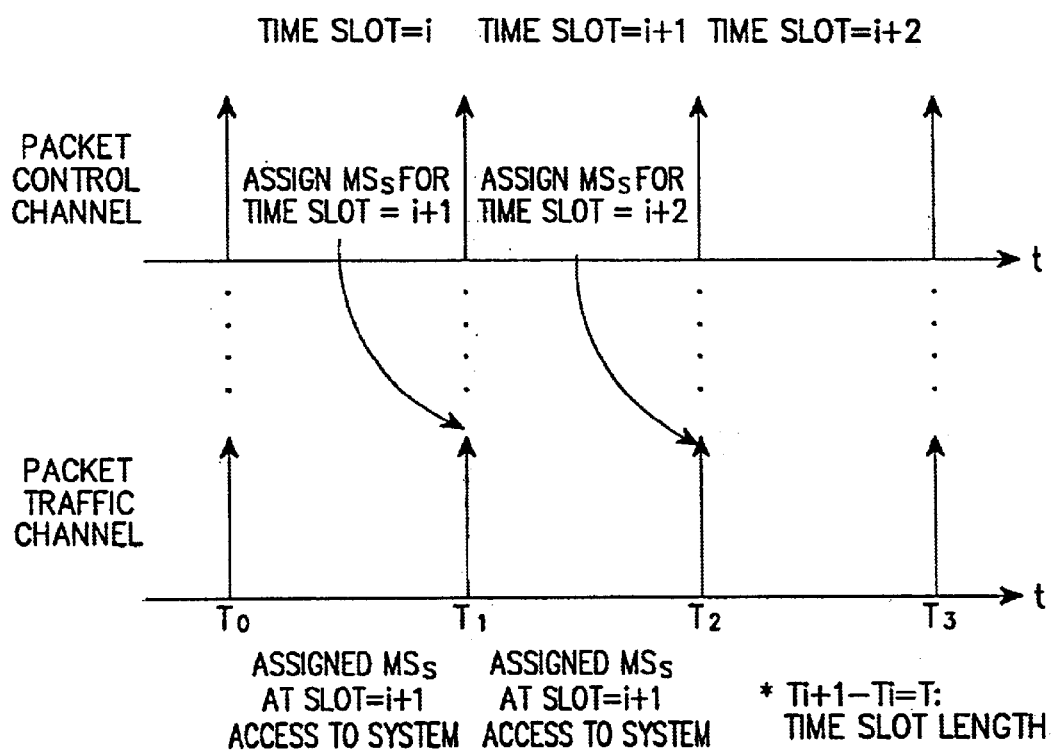
FIG. 14 is a graphical diagram illustrating an exemplary assignment of time slots accessible to a terminal on a packet control channel.

FIG. 14 illustrates the timing of a packet control channel with respect to that of a packet traffic channel in the case of controlling the terminal access on the packet control channel. Referring to FIG. 14, the packet control channel of an ith time slot designates a terminal authorized to access the base station in an (i+1)th time slot so that the designated terminal attempts to access the base station in the (i+1)th time slot when it has packet data to be transmitted to the base station.

(3) Use of Known Preamble Patterns

Repeated use of known short preamble patterns allows fast terminal acquisition. Since user discrimination is ensured by time slots and preambles in the above controlled collision method, use of known preambles in the conventional CDMA system requires only discrimination of cells and accessing users. Here, a limited number of short codes such as Baker codes having good correlation characteristics are assigned to cells and a packet service user in each cell accesses the base station with its assigned code in its time slot.

(4) Fast Power Control

The base station should search a delay time of a signal from a terminal since it does not know the delay time in an access attempt of the terminal. According to the present invention, when timing alignment is performed between the terminal and the base station and a time slot accessed by a specific base station is known, power control can be implemented at the start of access by arranging a sufficient number of correlators in a search window and adding the outputs of the correlators in excess of a predetermined threshold, thereby increasing the probability of fast mobile acquisition. As will be described, the correlators are preferably arranged in a comb-type correlator branch arrangement.

Figure 15:
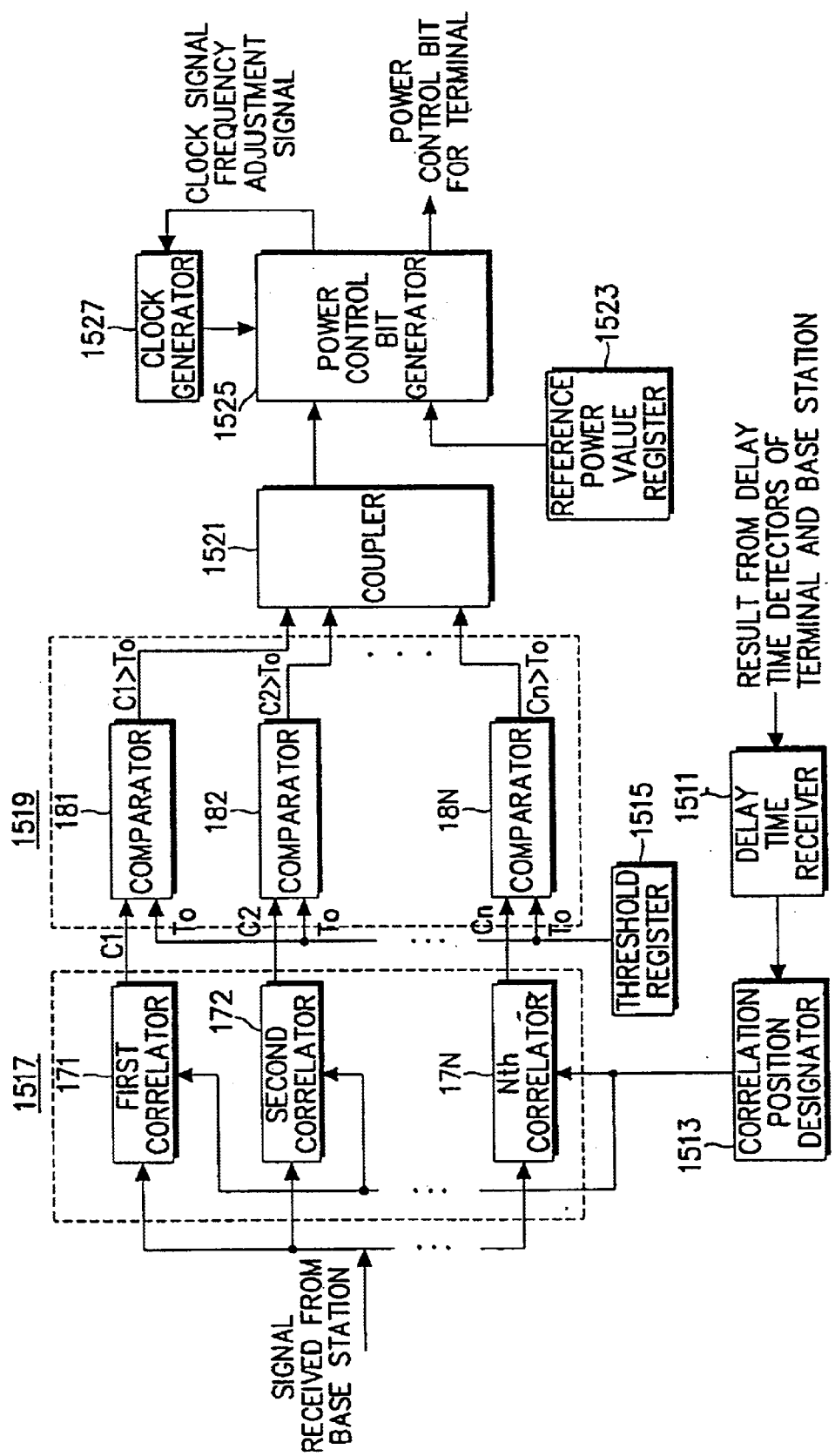
FIG. 15 is a block diagram of a receiver for fast initial power control in the base station.

FIG. 15 is a block diagram of a receiver of a terminal, for enabling the fast power control in an early stage. In FIG. 15, a delay time receiver 1511 receives a delay time from delay time detectors of a terminal and a base station. A correlation position designator 1513 receives the output of the delay time receiver 1511 and generates position designating signals for correlators so that the correlators can be arranged in a search window in a predetermined chip interval. Correlators 171 to 17N receive a signal received on a forward link, commonly, and their respective corresponding correlation position designating signals from the correlation position designator 1513 and detect correlation values C1 to CN for determining whether a receive signal is present in a designated position. A threshold register 1515 stores a threshold value To for determining whether the correlation values output from the correlators 171 to 17N are signal sources. Comparators 181 to 18N have comparing input ports connected to the output ports of the respective corresponding correlators 171 to 17N and reference input ports connected to the output port of the threshold register 1515. The comparators 181 to 18N compare the threshold value To with the outputs of the corresponding correlators 171 to 17N. If Ci> To, i being equal to 1,2, . . . n, the comparators 181 to 18N simply output their corresponding correlation values and, otherwise, they output zeroes. A coupler 1521 adds the outputs of the comparators 181 to 18N. A reference power value register 1523 stores a reference power value for determining a power control bit to increase or decrease power. A power control bit generator 1525 receives the outputs of the coupler 1521 and the reference power value register 1523. The power control bit generator 1525 generates a power control bit for decreasing power if the output of the coupler 1521 is larger than the reference power value, and a power control bit for increasing power if the output of the coupler 1521 is smaller than the reference power value. A clock generator 1527 generates a clock signal for determining an output period of the power control bit generator 1525 and adjusts a clock cycle by a clock frequency adjustment signal received from the power bit generator 1525.

Still referring to FIG. 15, the N correlators 171 to 17N, arranged in a search window in 0.5 chip intervals by the correlation position designator 1513, receive a signal from the base station and perform a correlation on specific preamble patterns in their positions of the search window. The comparators 181 to 18N compare the correlation results Ci (i=1, 2, . . . , N) of the correlators 171 to 17N with the threshold value To for determining the presence or absence of a signal source. If the correlation values C1 to CN are larger than the threshold value To, they output the corresponding correlation values to the coupler 1521 and, otherwise, they output zeroes to the coupler 1521.

The coupler 1521 adds the outputs of the N comparators 181 to 18N and applies the result to the power control bit generator 1525. Then, the power control bit generator 1525 compares the output of the coupler 1521 with the reference power value received from the reference power value register 1523. Here, if the output of the coupler 1521 is larger than the reference power value, the power control bit generator 1525 outputs a power control bit for reducing the reception power of a terminal to the terminal. If the output of the coupler 1521 is smaller than the reference power value, the power control bit generator 1525 outputs a power control bit for increasing the reception power of the terminal to the terminal.

The power control bit generator 1525 also adjusts the cycle of the clock generator 1527 for controlling the power control bit generation period. That is, it allows a normal power control in a short time by maintaining the clock signal generating cycle of the clock generator 1527 to be short, that is, maintaining the frequency of a clock signal to be high, and thus increasing a power control rate for a signal transmitted by the terminal. For example, the initial clock signal generating cycle of the clock generator 1527 can be set to 6.4 KHz.

If the power control bit generator 1525 determines that a normal power control is performed, the generator 1525 reduces the frequency of a clock signal generated from the clock generator 1527 so that the overhead power caused by the power control bit on a forward channel can be decreased. The correlation position designator 1513 determines where a delay time is generated in the search window having the N correlators 171 to 17N arranged therein from a delay time detected by the delay time detectors in the terminal and the base station, received from the delay time receiver 1511.

Figure 16A:
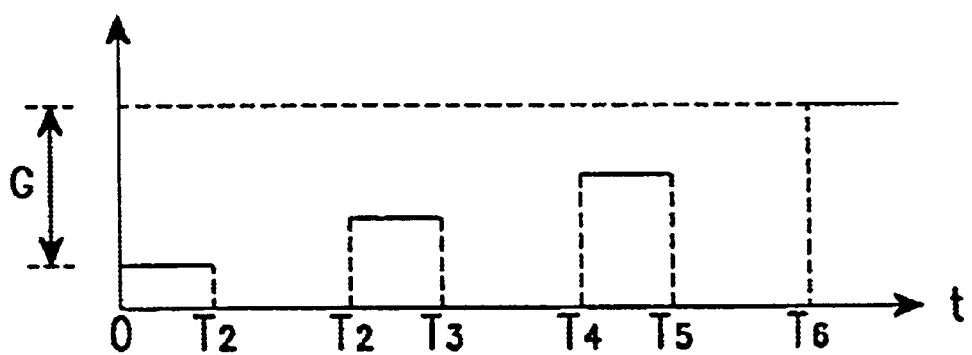
FIGS. 16A and 16B are graphical diagrams illustrating access power variations in the prior art and in an embodiment of the present invention, respectively.
Figure 16B:
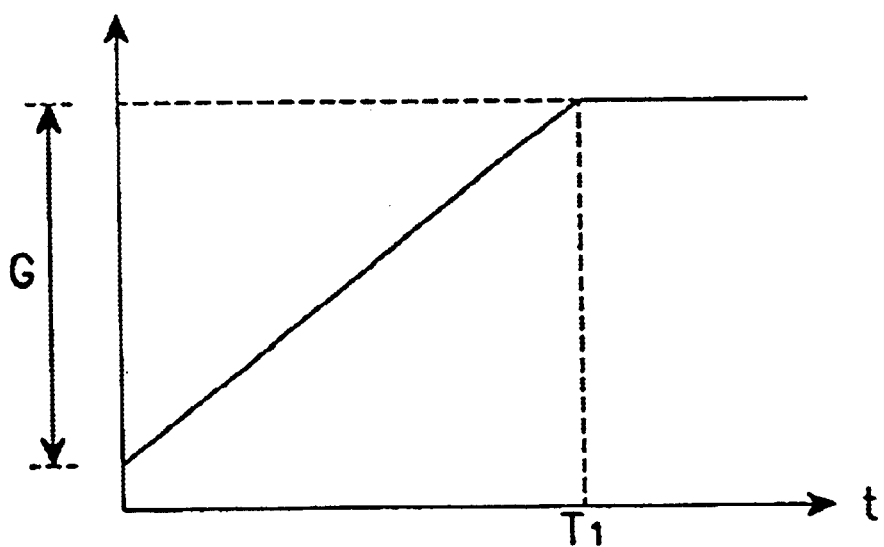

FIGS. 16A and 16B illustrate power variations in the prior art and in an embodiment of the present invention employing the above power control method, respectively. As shown in FIG. 16A, an access probe should be retransmitted at an increased power after a delay, to reach an intended power level in the prior art.

By contrast, the present invention allows the terminal to rapidly reach an intended power level by the above-described power control method and thus enables a fast mobile acquisition. In addition, the faster a power control cycle, the faster the terminal reaches the intended power level. Once the terminal is acquired and a normal power control is performed, the power control cycle can be increased. Though channel capacity can be increased by controlling the transmit power of the terminal under the power control, the power control bit itself adds to overheads and thus the power control bit can be reduced in a steady power control state after the mobile acquisition in view of the overheads.

For example, assuming that the power control cycle is 800×8 Hz, eight times larger than the conventional one per 1.25 ms, a power step size is 1 dB, and a gap G shown in FIGS. 16a and 16B is 8 dB, the terminal reaches an intended power level in 1.25 ms.

In accordance with the present invention as described above, channel capacity is efficiently used by reducing the time required for the initialization of a packet traffic channel in a packet data service of a mobile communication system. The channel capacity use efficiency is maximized by reducing the time and power for the initialization of the terminal through timing alignment between a terminal and a base station, controlled access collision, use of known preambles, and fast mobile acquisition and power control.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of initializing a packet traffic channel for synchronizing packet traffic channels between a base station and a mobile station at a state transition from a packet idle state to a packet busy state in a mobile communication system wherein the base station has a forward packet traffic channel and a packet traffic control channel and the mobile station has a reverse packet channel, and the base station transmits a packet control message for assigning time slots of the forward or the reverse packet traffic channel via a packet control channel when generating packet data to be communicated with a specific mobile station in the packet idle state, the base station and the mobile station transition to the packet busy state by occupying the forward or the reverse packet traffic channel in an assigned time slot and communicating the packet data via the occupied time slot of the forward or the reverse packet traffic channel between the base station, and then the mobile station and the base station transition to the packet idle state, comprising the steps of:
 (a) measuring and storing a delay time of a forward channel signal transmitted from the base station to the mobile station, and reporting the delay time to the base station in order to synchronize the timing of the mobile station to the timing of the base station, in the packet idle state after a call set up;
 (b) controlling access collision between mobile stations attempting to access a base station by assigning a specific time slot to each mobile station in an access attempt, and causing the mobile station to access in the assigned time slot;
 (c) achieving mobile acquisition rapidly by repeatedly using short preamble patterns for mobile stations; and
 (d) performing power control on the packet traffic channel by adding correlation values in a search window of the specific time slot.

2. The method of claim 1, wherein step (a) further comprises reporting the delay to the base station in response to a reporting time period signal received from the base station.

3. The method of claim 1, wherein step (a) further comprises determining when the delay time exceeds a delay time initially set by the base station and the mobile station by a predetermined threshold.

4. The method of claim 3, further comprising the steps of:
 storing an initial delay time;
 calculating a delay time difference signal by subtracting the delay time from the initial delay time;
 comparing the delay time difference signal to a threshold value; and
 reporting the delay time if the delay time difference is larger than the threshold value.

5. The method of claim 4, further comprising the step of updating the initial delay time if the delay time difference signal exceeds the threshold value.

6. The method of claim 1, wherein step (b) further comprises the base station providing an access permission message to the mobile station for enabling the mobile station to access the base station.

7. The method of claim 1, wherein step (c) further comprises using Barker codes.

8. The method of claim 1, wherein step (d) further comprises:
 receiving a signal from the base station;
 detecting the correlation values in response to correlation position designating signals;
 comparing the correlation values to a threshold value;
 if a correlation value is greater than the threshold value, outputting a respective correlation value;
 adding the respective correlation values; and
 comparing a sum of the added correlation values to a reference power value and generating a power control bit in response thereto.

9. The method of claim 8, wherein the power control bit serves to decrease power if the sum of the added correlation values is larger than the reference power value.

10. The method of claim 8, wherein the power control bit serves to increase the power if the sum of the added correlation values is smaller than the reference power value.

11. The method of claim 8, wherein the power control bit adjusts a cycle of a clock for controlling a power control bit generation period.

12. The method of claim 1, wherein step (b) further comprises the base station setting a time slot index for each mobile station corresponding to the time slot to which the mobile station is assigned to for access.

13. The method of claim 12, further comprising the steps of:
 receiving the time slot index at the mobile station;
 comparing the time slot index to a time slot index count; and
 the mobile station attempting access when the time slot index count equals the time slot index.

14. An apparatus for initializing a packet traffic channel for synchronizing packet traffic channels between a base station and a mobile station at a state transition from a packet idle state to a packet busy state in a mobile communication system wherein the base station has a forward packet traffic channel and a packet traffic control channel and the mobile station has a reverse packet channel, and the base station transmits a packet control message for assigning time slots of the forward or the reverse packet traffic channel via a packet control channel when generating packet data to be communicated with a specific mobile station in the packet idle state, the base station and the mobile station transition to the packet busy state by occupying the forward or the reverse packet traffic channel in an assigned time slot and communicating the packet data via the occupied time slot of the forward or the reverse packet traffic channel between the base station, and then the mobile station and the base station transition to the packet idle state, the apparatus comprising:
 means for measuring and storing a delay time of a forward channel signal transmitted from the base station to the mobile station, and reporting the delay time to the base station, and synchronizing the timing of the mobile station to the timing of the base station, in the packet idle state after a call set up;
 means for controlling access collision between mobile stations attempting to access a base station by assigning a specific time slot to each mobile station in an access attempt and causing the mobile terminal to access in the assigned time slot;

means for achieving mobile acquisition rapidly by repeatedly using short preamble patterns for mobile stations; and means for performing a power control on the packet traffic channel by adding correlation values in a search window of the specific time slot.

15. The apparatus of claim 14, wherein the reporting means further comprises means for reporting the delay to the base station in response to a reporting time period signal received from the base station.

16. The apparatus of claim 14, further comprising means for determining when the delay time exceeds a delay time initially set by the base station and the mobile station by a predetermined threshold.

17. The apparatus of claim 16, further comprising:

means for storing an initial delay time;

means for calculating a delay time difference signal by subtracting the delay time from the initial delay time;

means for comparing the delay time difference signal to a threshold value; and means for reporting the delay time if the delay time difference is larger than the threshold value.

18. The apparatus of claim 17, further comprising means for updating the initial delay time if the delay time difference signal exceeds the threshold value.

19. The apparatus of claim 14, wherein the controlling means further comprises means for the base station to provide an access permission message to the mobile station for enabling the mobile station to access the base station.

20. The apparatus of claim 14, wherein the acquisition achieving means further comprises using Barker codes.

21. The apparatus of claim 14, wherein the power control performing means further comprises:

means for receiving a signal from the base station;

means for detecting the correlation values in response to correlation position designating signals;

means for comparing the correlation values to a threshold value;

means for outputting a respective correlation value if a correlation value is greater than the threshold value;

means for adding the respective correlation values; and means for comparing a sum of the added correlation values to a reference power value and generating a power control bit in response thereto.

22. The apparatus of claim 21, wherein the power control bit serves to decrease power if the sum of the added correlation values is larger than the reference power value.

23. The apparatus of claim 21, wherein the power control bit serves to increase the power if the sum of the added correlation values is smaller than the reference power value.

24. The apparatus of claim 21, wherein the power control bit adjusts a cycle of a clock for controlling a power control bit generation period.

25. The apparatus of claim 14, wherein the controlling means further comprises means for setting, in the base station, a time slot index for each mobile station corresponding to the time slot to which the mobile station is assigned to for access.

26. The apparatus of claim 25, further comprising:

means for receiving the time slot index at the mobile station;

means for comparing the time slot index to a time slot index count; and means for the mobile station to attempt access when the time slot index count equals the time slot index.

* * * * *